United States Patent [19]

Medin

[11] Patent Number: 4,670,785

[45] Date of Patent: Jun. 2, 1987

[54] SYNCHRONIZATION INTERFACE CIRCUIT

[75] Inventor: David L. Medin, Rockville, Md.

[73] Assignee: U.S. Video, Maitland, Fla.

[21] Appl. No.: 721,364

[22] Filed: Apr. 9, 1985

[51] Int. Cl.⁴ .............................................. H04N 5/04
[52] U.S. Cl. ................................... 358/149; 358/148
[58] Field of Search ................ 358/148, 149, 150, 17; 340/814

[56] References Cited

U.S. PATENT DOCUMENTS

| | | | |
|---|---|---|---|
| 4,203,135 | 5/1980 | Sasaki | 358/149 |
| 4,346,407 | 8/1982 | Baer et al. | 358/148 |
| 4,450,480 | 5/1984 | De La Cierva | 358/149 |
| 4,554,582 | 11/1985 | Wine | 358/149 |

*Primary Examiner*—Jin F. Ng
*Attorney, Agent, or Firm*—Shlesinger, Arkwright, Garvey & Fado

[57] ABSTRACT

The synchronization of the computer sync signal and video or other signal input is provided by shifting the computer sync signal to bring it into alignment with the video sync signal by modifying the clock pulse output signal of the computer.

8 Claims, 10 Drawing Figures

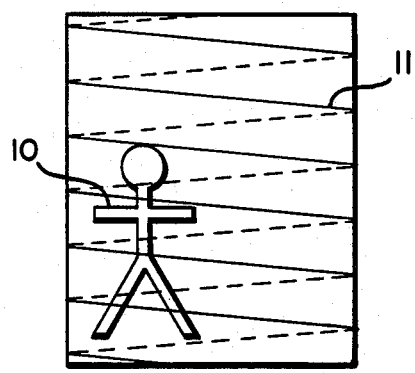
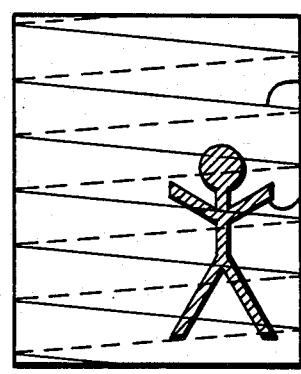
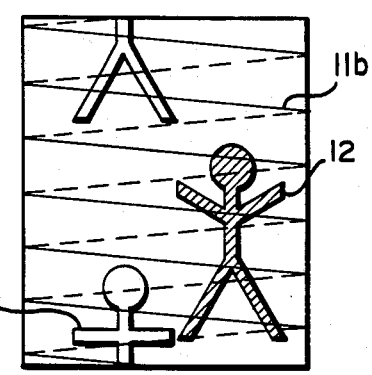
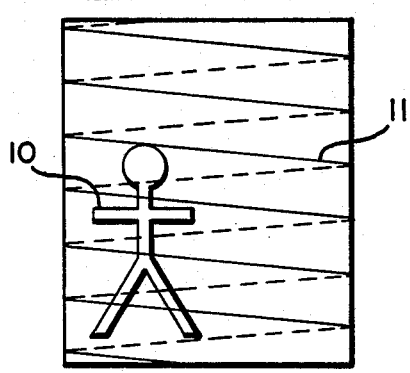
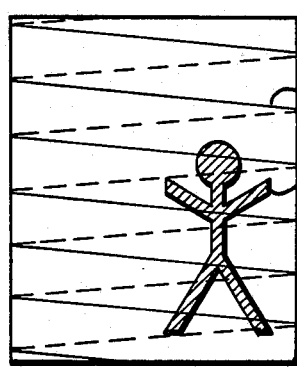
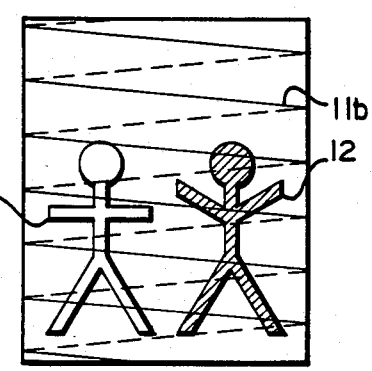
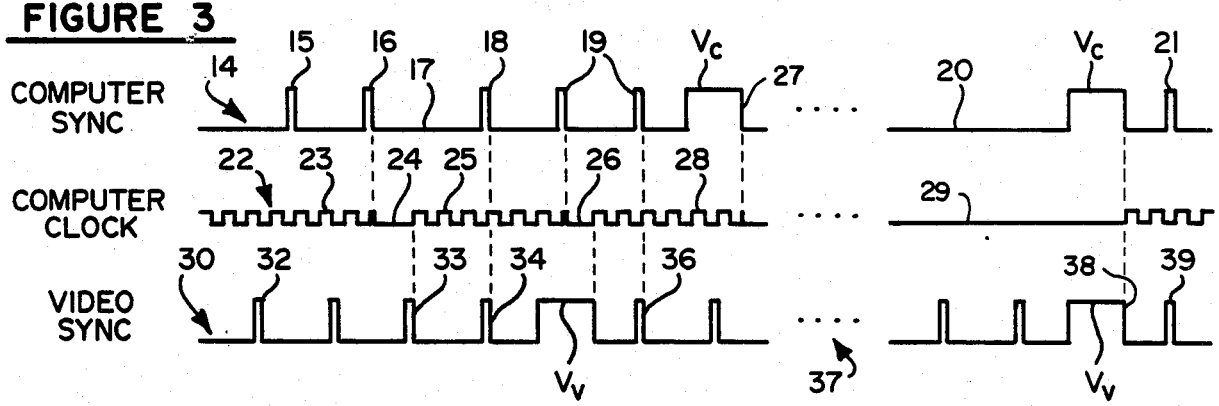
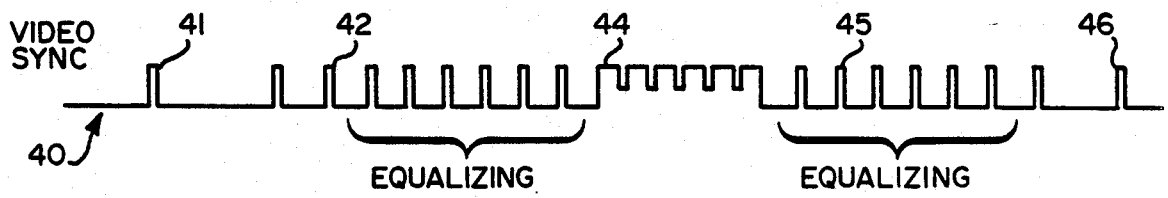

SYNCHRONIZATION INTERFACE CIRCUIT

BACKGROUND OF THE INVENTION

This invention relates to an electronic synchronization interface circuit, and in particular to an electronic interface circuit which enables the computer and video images to readily be displayed simultaneously on a monitor.

In the past it has been necessary for synchronization of the incoming signal to modify the computer system in order to adjust the differences in the clock systems of independent signals. The Baer U.S. Pat. No. 4,346,407 is of interest in this respect. It should be noted that this patent deals with an overlay and accomplishes synchronization of the signals by substituting for the computer clock, the control clock of the Baer system. This arrangement has a distinct drawback of requiring extensive circuit revision of the computer system and use of extensive circuitry to bring about the desired synchronization between the different types of signals.

The Baer circuit is complex, and also does not meet the requirement of a simple direct plug-in system which will adequately make the sync conversion without disrupting the actual computer system itself. With the extensive use of different types of equipment for feed-in to a common monitor, there is an increasing demand for a readily usable system which is inexpensive, is adaptable to different types of inputs, can be mass marketed, and does not require extensive modification of equipment.

SUMMARY OF THE INVENTION

Accordingly, it is a principal object of this invention to provide an electronic synchronization interface for receiving plural input signals from different sources for common display on a monitor, which is substantially superior to prior existing types of synchronization circuits.

A feature of this invention is to provide a good synchronization interface circuit which is relatively inexpensive, is readily usable with different types of equipment, and does not require extensive circuit conversion of the interfitted systems.

Another feature of this invention is to provide a synchronization interface circuit for data information transfer in which the computer and the other incoming signal to which it is matched are accurately synchronized to provide for better than normal noise characteristics, faster speed, and lower error rate.

Another feature of this invention is the provision of a synchronization interface circuit in which any two input signals can readily be synchronized for common display.

A further feature of this invention is to provide a synchronization interface circuit which is substantially less complex than previous circuits, and can be produced at a substantially lower cost than previous types of circuits.

A further feature of this invention is the provision of a synchronization interface circuit which requires no internal modification or rearrangement of the interconnected equipment, and is capable of simply being plugged into the other equipment.

A still further feature of this invention is the provision of a synchronization interface circuit in which a computer and video signal can be either accurately synchronized for overlay alignment, or provision made for a deliberate shift in frame position on the monitor, if desired.

A still further feature of this invention is the provision of a synchronization circuit which does not require any particular technical expertise for set-up and use, and is thus readily usable by non-technically skilled people, such as instructors and educators wishing to provide greater screen display capability for instruction purposes.

A still further feature of this invention is to provide a synchronization interface circuit in which it is possible to modify a clock output signal from the computer clock.

A still further feature of this invention is the provision of a high speed sync lock gating circuit for use with such synchronization interface circuit for accurately determining difference in time between the several incoming signals to be displayed on the monitor.

These and other features and advantages of the invention will be readily apparent in view of the following description and drawings, of the described invention.

DESCRIPTION OF THE DRAWINGS

FIGS. 1a, 1b and 1c show monitor screen displays illustrating frame arrangement for both computer and video images and overlay misalignment which occurs without synchronization of the incoming signals.

FIGS. 2a, 2b and 2c show another series of screen displays illustrating video and computer frame arrangement on a monitor screen when there is synchronization between the signals supplied to the monitor.

FIG. 3 shows computer and video sync pulse wave forms and illustrates the manner of producing a relative shift to bring the synchronization pulses into alignment.

FIG. 4 shows a video input segment with the equalizing and horizontal pulses adjacent the vertical synchronization pulse.

DESCRIPTION OF THE INVENTION

Figure 5:
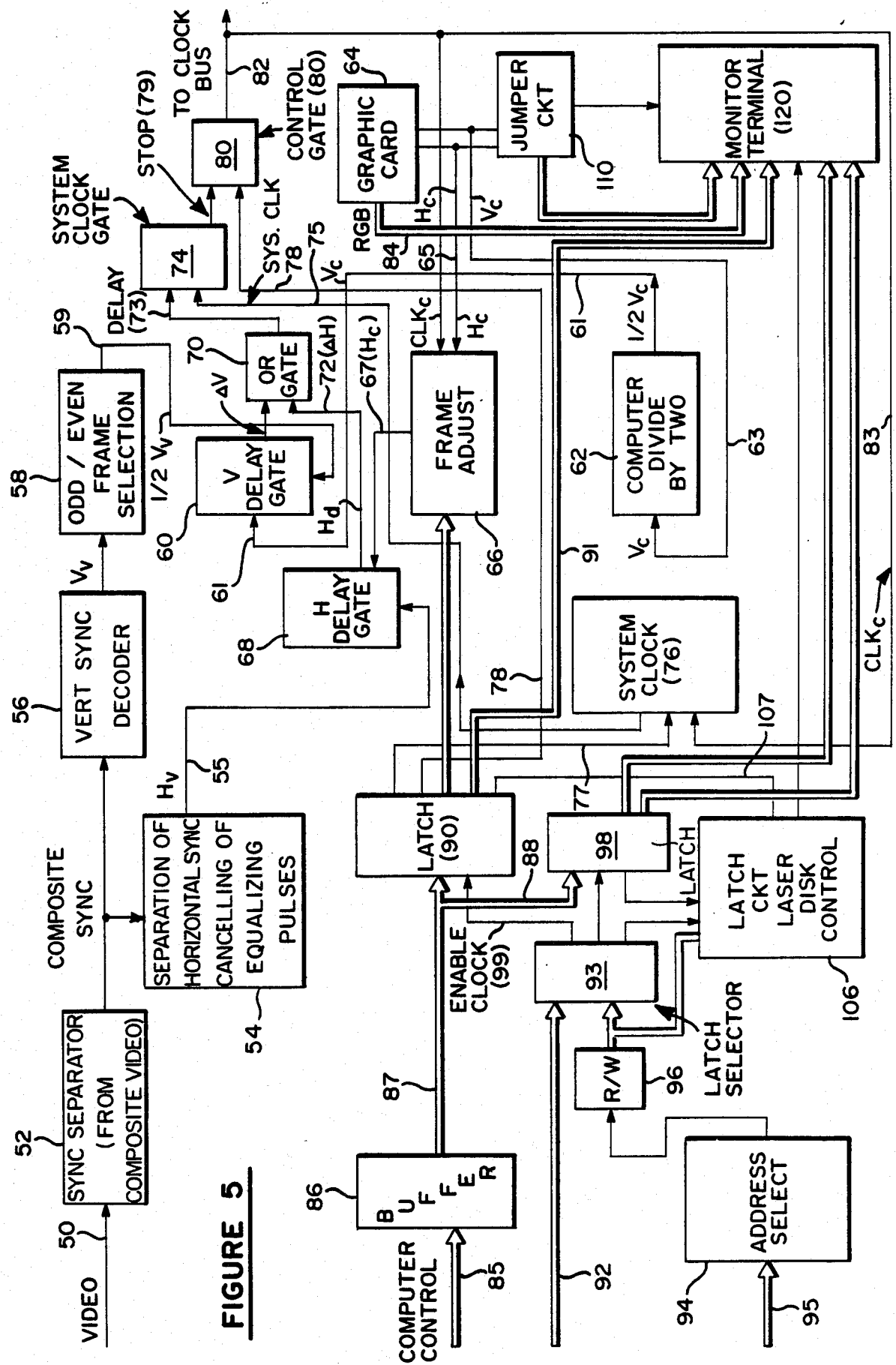
FIG. 5 is a block diagram of the interface circuit.

Referring particularly to the Figures, FIG. 1a shows a screen displaying a stickman image 10 which appears on the left side of the screen and is generated by the computer signals through scan lines 11a of the monitor. FIG. 1b shows a second stickman 12 which appears on the right side of the screen and is generated by the video signal through scan lines 11b of the monitor. In both of these FIGS. 1a and 1b, the illustrated stickman FIGS. 10 and 12 are shown in the correct aligned position on the basis of their individual synchronizing pulses (11a and 11b) which control the monitor display. The monitor relies on receipt of synchronizing pulses which are supplied to it by the equipment to which it is connected. When two individual sets of signals are received, they are not in synchronization; one set of synchronization pulses from one of the sources must be used. In this example, the synchronization pulses 11b are used. Misalignment is then encountered with the other video signal, in such as shown in FIG. 1c, which stickman 10 is then not in direct vertical or horizontal alignment with stickman 12. This situation is corrected by the interface sync circuit.

The incoming computer and video signals are respectively shown in FIGS. 2a and 2b and are the same as corresponding FIGS. 1a and 1b previously discussed. In FIG. 2c, however, it will be noted that stickman 10 generated by the computer signal is in correct alignment, and is made possible is made by the synchronization of the vertical and horizontal pulses of the two incoming signals which assures the correct simultaneous alignment of both stickman figures on the display.

The manner in which this is accomplished is through the modifying of the computer clock which controls the generation of its synchronization signals. This can be done by either deleting or inserting the computer clock pulses until there is alignment with the video synchronization pulses, or by speeding up or slowing down the computer clock pulse rate. The advantage of the modification of computer pulse output is the limited requirement of any modification of the computer circuitry.

The manner in which this is accomplished is shown in FIG. 3 which illustrates the shift that is made with respect to the vertical synchronization pulses to bring the computer vertical sync pulse train in alignment with the video sync vertical pulse train by interrupting the computer clock pulse output. When the clock is interrupted, the generation of computer sync pulses is also interrupted.

In FIG. 3, the video synchronization signal from the computer shown in the pulse train generally indicated at 14 contains horizontal synchronization pulses 15, 16, 18 and 19, followed by a vertical sync pulse $V_c$. When the time control switching is made so as to display both video and computer, synchronizating pulse trains are not synchronized, i.e. not in alignment, since both are running independently. This can be seen from the illustration in FIG. 3, where the computer sync pulse trains, are shown to be initially not in alignment. They are subsequently brought into alignment by interrupting the computer clock pulse output, generally indicated at 22, as shown. The video sync signal is used as the reference, and it will be noted that it is continuous and not interrupted, but that the computer sync and computer clock pulse train are interrupted.

Referring particularly to the pulse trains of FIG. 3, the computer sync pulse train 14 ordinarily has equally spaced horizontal sync pulses, the interval between which are equal to the intervals between the horizontal sync pulses of the video sync pulse train 30.

The pulse trains of FIG. 3 are shown in their initial state on the left to be out of alignment. This would be the condition immediately after switching in a second signal for simultaneously displaying them on a monitor.

The circuit of this invention brings the video and computer sync pulse trains into alignment by a gating circuit in which the two sets of horizontal sync signals (computer and video) are gated to provide a control signal level, the duration of which is dependent on the relative time displacement between the two horizontal sync pulses of each pulse train. In a similar matter, there is a gating adjustment for the time interval difference between corresponding vertical sync pulses of the computer and video sync pulse trains.

The pulse trains 14, 22 and 30 of FIG. 3 illustrate the manner in which the computer and video sync pulse trains are brought into alignment after switching from separate to common operation, such as for common display of a monitor.

Initially, the pulses are out of synchronization or registry as indicated by the horizontal pulses 16 and 33 of pulse trains 14 and 30 respectively. Registry is brought about by interrupting of the computer clock pulse train 22. When this occurs, there is a delay in generation of the computer clock pulses, and accordingly an equal delay in generation of horizontal computer sync pulses.

Following the pulse trains from left to right, horizontal computer sync pulse 16 shuts off the computer clock pulse at 23 since there is not a corresponding registered horizontal video sync pulse. The clock pulse train will be interrupted until the next horizontal video sync pulse 33 at its trailing edge resumes the reception of computer clock pulses. Unless synchronization between the two pulse trains is in process, the length of time between the horizontal sync pulses of the computer is basically identical to the length of time between horizontal sync pulses of the video. However, with the interruption of the clock pulse, the duration of time between horizontal computer sync pulses 16 and 18 is lengthened. This interval 17 is the sum of the normal time interval plus the clock interrupt time interval 24. The subsequently received clock pulses will key the horizontal computer sync pulse 18 to the horizontal sync pulse 33 through the intervening block of computer clock pulses 25. This will bring horizontal computer pulse 18 into registry with the next video horizontal sync pulse 34.

The circuit arrangement is such that the trailing edge of each computer sync pulse, either horizontal or vertical interrupts the computer clock pulse train. Conversely, on reaching the trailing edge of each video sync, the clock pulse train signal is resumed.

Consequently, the trailing edges of the computer sync pulses interrupt the clock pulse train, while at the trailing edge of the video vertical sync pulse $V_v$ and video horizontal sync pulse 36, the computer clock pulses resume.

In FIG. 3, the trailing edge 38 of computer sync pulse $V_c$ interrupts the computer clock pulse train. Since there will be no subsequent computer clock pulse generation until the trailing edge 38 of the next video vertical sync pulse $V_v$ occurs, and the computer clock is interrupted for the interval 29. With the interruption of the computer clock pulse, and the keying of resumption of clock pulses, which are keyed to the video signal as a reference, the computer sync pulse train 22 is brought to alignment and registry with the video sync pulse train.

It is necessary to eliminate the equalizing pulses of the video vertical sync signal, which is illustrated in FIG. 4. These occur before each video vertical sync signal, but are not shown within the video sync signals of FIG. 3. Referring to FIG. 4, a magnified video sync signal pulse section generally indicated at 40 shows the horizontal sync pulses 41 followed by seven equalizing pulses generally indicated at 42. These immediately precede the vertical sync pulse generally indicated at 44. Further equalizing pulses 45 and subsequent horizontal sync pulses 46 follow the vertical sync pulse 44. In addition, the equalizing pulses are counted to provide a reference as to whether or not the vertical sync pulses are for an even or an odd frame in the interlaced scan. Only one scan sequence, either odd or even, is to be followed for vertical registration purposes.

The specific block diagram for the interface circuit is shown in FIG. 5. The video signal 50 is supplied to the Sync Separator 52, which removes the composite sync. The video horizontal sync pulses ($H_v$) are separated and the Equalizing Pulses are cancelled in Section 54. The vertical synchronizing video sync then is separated through a Decoder 56 from where it passes to an Odd-/Even Frame Selection 58. This produces an output signal 59 which is one half the vertical synchronizing pulse count, and the signal is supplied to the Vertical Pulse Delay Gate 60. The computer vertical synchronizing pulses are supplied to the Gate along line 61. This signal represents one half the number of vertical computer pulses originally supplied from the computer vertical sync input $V_c$ of the Graphic Card 64 to the computer Divide By Two Sections 62 along line 63.

The vertical Sync Signal Delay Gate 60 is a latch which will provide an output which represents the difference in time between the video vertical sync and the computer vertical sync signals. This output signal from the Latch 60 will provide a signal representing the time difference from, the vertical sync pulse of the computer until the occurence of the vertical sync pulse signal.

The computer Graphics Card 64 also supplies computer horizontal sync signals ($H_c$) to the Frame Adjusting Circuit 66, which in turn supplies a horizontal computer sync pulse along line 67 to the Horizontal Delay Gate 68. The Gate is controlled by input from the horizontal computer sync signal 67 and a horizontal video sync signal supplied along line 55 also to the Delay Gate 68. This acts in the same fashion as the vertical sync pulse Delay Gate 60 to provide a delay signal dependent upon the time interval between the horizontal video signal and the horizontal computer signal. This signal is supplied along line 72 and represents the difference in time or delay value for the system clock gate.

The compensation or delay interval is controlled by the application of horizontal and vertical misaligned intervals to the OR Gate 70. The output from the OR Gate is passed along line 73 to the System Clock Gate 74 to interrupt receipt of the computer clock pulses. The delay gates are latches in which the output acts to stop the clock pulse train for the interval until the next video sync pulse is received. The horizontal and the vertical pulses are gated through Gate 70, and the delay interval signal is supplied to the Gated Latch 74 together with a system clock pulse supplied along line 75 from the System Clock Section 76. This clock pulse is necessary to supply the synchronized gate output signal which is synchronized with the computer clock gate to ensure that the computer clock is started only at the correct instant for resumption of clock operation.

The control gate 80 is an open collector AND gate which receives a control line input which permits turning on or off the sync clock interval pulse along lines 79. If the computer clock pulse is to be brought into sync lock, the output pulse along line 82 is supplied to the computer clock bus (not shown). For control of the System Clock Section to correlate with the computer, the line 83 supplies clock pulses from the computer along line 83 to both the Frame Adjust Section 66 and the System Clock Section 76.

The computer has two input sections to the interface circuit. The Graphic Card Section 80 previously mentioned, provides for the horizontal and vertical computer sync pulses input as well as the three monitor RGB lines. In addition, computer control lines 84 are fed through buffer section 86 and lines 87 to the Control Latches 90.

Computer address lines 95 supply Address Decoder Selector Section 94. Its output is supplied to the Read-/Write Section 96. These are then decoded along with input lines 92 by latch selector 93. Lines 88 supply Latch 98 and the Latch Circuit Laser Disk Control Section 106.

A control line 107 connects the Latch section 90 to the Laser Disk Control Section 106. Control lines 91 connect the Latch 90 to the Monitor Terminal 120. Monitor Terminal 120 also receives plural control lines from the Jumper Circuit 110 as well as the single input control lines to the Laser Disk Control Section.

Figure 6:
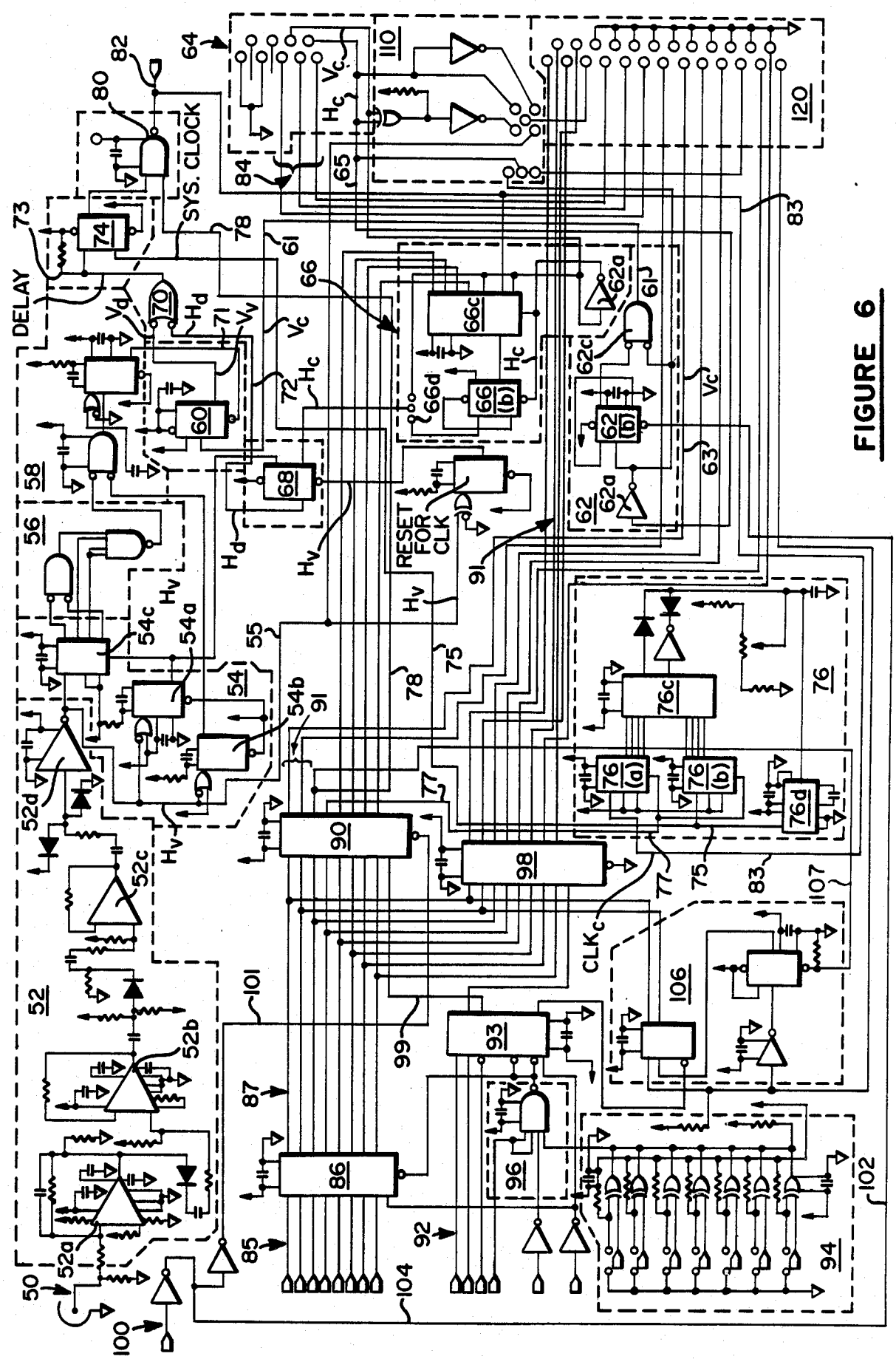
FIG. 6 is a schematic of the interface circuit.

The specific electrical circuit schematic for the overlay monitor interface is shown in FIG. 6. The arrangement of sections shown in FIG. 5 matches the actual circuit configurations in this more detailed schematic. The sections are also identified with the similar numbers and shown in dotted outline. The Sync Separator Circuit 52 has four amplifiers 52a, 52b, 52c and 52d. The horizontal pulse separator and equalizing pulse cancelling circuit 54 includes a one shot component 54b, a counter 54a and a reset latch 54c. Decoder section 56 consists of several AND gates. The Odd/Even Frame Selection Section 58 consists of an AND gate with a one shot, the output of which is connected to the Vertical Delay Gate Latch 60.

The computer Graphics Card Section 64 has nine pins and it will be seen that the two lower outside pins respectively supply computer vertical and horizontal sync signals along lines labeled $V_c$ and $H_c$ respectively.

The Frame Adjust Circuit 66 includes an inverter 66a which receives the computer horizontal sync pulse which is supplied to a flip-flop 66b, which then is connected to a delay counter 66c. It receives an input from the computer bus 82 as well as the control sequence from the programmable control latch 90. The programmer will count the delay that may be inserted into the Horizontal Delay Gate. This provides the ability to offset the computer display if desired. The switch arrangement 66d provides either a direct alignment capability through the flip-flop 66b, or on switching, the programmed delay that might be desired through the Gated Latch 68. The Gated Latch also receives an input from the equalizing pulse cancelling circuit counter 54a which determines whether or not there is an odd or even frame by counting either 6 or 7 equalizing pulses. The control signal is supplied to the gate so that the horizontal sync difference for the odd/even frame between the computer and video signals is determined and this line supplies the D input to the latch representing the normal horizontal field. Shift control supplied through line $H_c$ representing the computer horizontal sync, whether it is to be in direct alignment, or delayed is applied to the Latch clock input. The output from the Latch is supplied as mentioned above directly to the OR gate 70 along lines 72 and is the $H_d$ input.

In order for the circuit to function effectively, the system must supply a clock pulse to take over for the computer clock pulse during the interval that the receipt of the computer clock pulse is blocked.

The system clock 76 is used for this purpose. It is a phase locked loop circuit having counters 76a and 76b which are fed to a comparator 76c. The output of 76c controls the output of a voltage controlled oscillator 76d. Counter 76a is the system count clock, and counter 76b is the voltage controlled oscillator clock. Comparator 76c compares both clocks and adjusts the voltage controlled oscillator 76d. The output from the voltage controlled oscillator 76d is supplied along line 75 to provide the system clock input to the System Clock Gate 74. This matches the computer clock input which is fed from line 82 along 83 into the System Count Clock circuit 76a.

Computer controlled functions are supplied through the Buffer 86 and Latch 90 and the interrelationship with the Address Select Circuit 93 to provide the desired control function that either effect the offset of the frame adjust circuit as mentioned above, or affect other particular control features, which are directly connected to the monitor terminal 120. The accurate control of the circuit is made possible by the use of the fast acting gated latches 60 and 68 which are gated at the trailing edge of the vertical and horizontal video sync pulses.

It will be noted that the circuit also contains a Latch Circuit Control for laser disks 106, and the disk circuit is directly connected to the Monitor Control Terminal.

The Jumper Circuit 110 permits other control arrangements, as can be seen in the connections between the Monitor Terminal 120, and the Graphics Card 64.

It will thus be seen that this overlay interface circuit provides a direct, accurate control for either exact alignment of the video signal and the computer signal, or if desired, the ability to displace the picture through the frame adjust circuit, as well as other monitor control features.

While this invention has been described as having a preferred design, it is understood that it is capable of further modifications, uses and/or adaptations of the invention following in general the principle of the invention and including such departures from the present disclosure as come within known or customary practice in the art to which the invention pertains and as may be applied to the central features hereinbefore set forth, and fall within the scope of the invention of the limits of the appended claims.

I claim:

1. A synchronization interface circuit, comprising:
   (a) a video signal synchronization separator means for separating video vertical sync and horizontal sync signals to produce separate vertical and horizontal sync pulse outputs,
   (b) a computer horizontal sync pulse means for receiving computer horizontal sync pulses,
   (c) a computer vertical sync pulse means for receiving computer vertical sync pulses,
   (d) a vertical delay gate connected to the video separator means and the computer vertical pulse receiving means for receiving the video vertical sync signals and the computer vertical sync signals and providing a signal output representing a time interval difference between the video and computer vertical sync signals,
   (e) a horizontal delay gate connected to the video signal sync separator means and the computer horizontal sync receiving means for receiving the video horizontal sync and the computer horizontal sync signals and producing a signal output representing the time interval difference between the video and the computer horizontal sync signals, and
   (f) system gate means connected to both the vertical delay gate and the horizontal delay gate for producing a signal representing the total delay output of the horizontal and vertical delay gates for interrupting computer clock pulse signals to bring the video and computer signals into desired synchronization.

2. The synchronization interface circuit as set forth in claim 1, wherein:
   (a) the delay gates are fast acting latch gates.

3. The synchronization interface circuit as set forth in claim 2, wherein:
   (a) the output of the system gate means is connected to a computer clock output and provides a signal to override the clock pulses,
   (b) the computer horizontal sync pulse means includes means for providing an offset signal controllable by a computer which will allow a computer image to be shifted with respect to a video frame, and
   (c) system clock means for supplying a clock pulse equal to that of the computer clock pulse is connected to the system gate means for controlling the relative timing of the circuit and the computer signals.

4. The synchronization interface circuit as set forth in claim 1, wherein:
   (a) the output of the system gate means is connected to a computer clock output and provides a signal to override the clock pulses.

5. The synchronization interface circuit as set forth in claim 1, wherein:
   (a) the computer horizontal sync pulse means includes means for providing an offset signal controllable by a computer which will allow a computer image to be shifted with respect to a video frame.

6. The synchronization interface circuit as set forth in claim 5, wherein:
   (a) system clock means for supplying a clock pulse equal to that of the computer clock pulse is connected to the system gate means for controlling the relative timing of the circuit and the computer signals.

7. The synchronization interface circuit as set forth in claim 1, wherein the delay gates are referenced to either the leading or trailing edges of the sync pulses to provide for adjustment of the synchronization between the video and computer sync pulses.

8. The synchronization interface circuit as set forth in claim 7, further comprising means for permitting selection of an odd or even frame interconnected to the gate means.

* * * * *